United States Patent [19]

Smith et al.

[11] 4,391,561

[45] Jul. 5, 1983

[54] SOLIDS PUMPING APPARATUS

[75] Inventors: Donald A. Smith, Haddam, Conn.; Bruce M. Pote, Playa del Rey, Calif.

[73] Assignee: Combustion Engineering, Inc., Windsor, Conn.

[21] Appl. No.: 343,688

[22] PCT Filed: Apr. 13, 1981

[86] PCT No.: PCT/US81/00485

§ 371 Date: Apr. 13, 1981

§ 102(e) Date: Apr. 13, 1981

[87] PCT Pub. No.: WO82/03615

PCT Pub. Date: Oct. 28, 1982

[51] Int. Cl.³ .............................................. B65G 53/48
[52] U.S. Cl. .................................... 414/218; 198/661; 406/61
[58] Field of Search ...................... 414/190, 197, 218; 198/661; 406/53, 56–58, 61

[56] References Cited

U.S. PATENT DOCUMENTS 3,093,419  6/1963  Bowers ................................. 406/61

FOREIGN PATENT DOCUMENTS 197708  8/1977  U.S.S.R. ................................. 406/61

Primary Examiner—Robert G. Sheridan
Attorney, Agent, or Firm—Edward L. Kochey, Jr.

[57] ABSTRACT

A pump for feeding granular material into a pressurized zone having a feed screw (14) located within a cylinder (12). The cylinder is tapered (34) at its discharge end, and the outside diameter of the flights (32) is also tapered (43). The clearance (38) of the tapered flights is significantly greater than the clearance (40) of the non-tapered flights.

12 Claims, 2 Drawing Figures

SOLIDS PUMPING APPARATUS

BACKGROUND OF THE INVENTION

This invention relates to the feeding of particulate matter into a high pressure zone, and in particular to a screw feed apparatus frequently known as a solids pump.

There are occasions such as introducing pulverized coal into a high pressure air stream where it is necessary to pump the coal to this high pressure level. This has been done with screw pumps where a helical member having flights is rotated within a cylinder, and the coal is supplied to the upstream end of this cylinder. These pumps operate at high speed (over 900 rpm).

In some cases a reducing pitch is used so that the coal is compacted as it travels through the cylinder, becoming sufficiently compacted that the high pressure air cannot leak back through the coal. In other cases a reducing nozzle is located at the outlet end so that the coal is compacted as it pushes through the nozzle thereby forming a seal at that location.

Those pumps we have been able to find which are capable of sealing against a reasonable back pressure have suffered from the disadvantage of high power consumption.

SUMMARY OF THE INVENTION

Accordingly, it is an object of our invention to pump particulate or granular solids into a high pressure zone without back leakage of gases and with a relatively low power consumption.

An apparatus for feeding a granular material into a pressurized zone has a stationary hollow cylinder with a frustoconical reducing nozzle located at the discharge end. Means for feeding the granular material into the cylinder is located at the upstream end. A rotary feed screw is located within the cylinder and has helical flights which have a decreasing pitch towards the discharge end. This feed screw is rotated at high speed within the cylinder. At the discharge end the outside diameter of the flights have a taper which is preferably equal to but possibly greater than the taper of the nozzle. The helical feed screw is located in a position slightly withdrawn from the discharge end so that the radial clearance between the tapered flights and the nozzle is significantly greater than the radial clearance between the uniform OD flights and the bore of the cylinder. The tapered flights extend into but not completely through the nozzle. A columnal plug preferably cylindrical is centrally located within the nozzle and attached to the end of the feed screw.

The optimum length of the tapered portion of the flights appears to be between 40 and 60 percent of the inside diameter of the cylinder. Successful operation has been experienced with the radial clearance between the flights and the nozzle being greater than twice the clearance between the uniform OD flights and the bore, while even better performance has been experienced when this ratio exceeds four. The cylindrical plug is located within the nozzle by making it an extension of the feed screw shaft. It is believed that best operation is obtained if the taper of the flights equals that of the nozzle and that furthermore the clearance between the tapered flights and the nozzle should exceed three times the largest particle size of the material being pumped.

The knowledge of superior performance of our invention flows from test results. The theory underlying the superior performance is based on speculation. Tests were being run to determine an optimum coal plug thickness. The screw shaft was once withdrawn as a shortcut method for obtaining a thicker plug, and the superior results were first noticed.

DESCRIPTION OF THE PREFERRED EMBODIMENT

Figure 1:
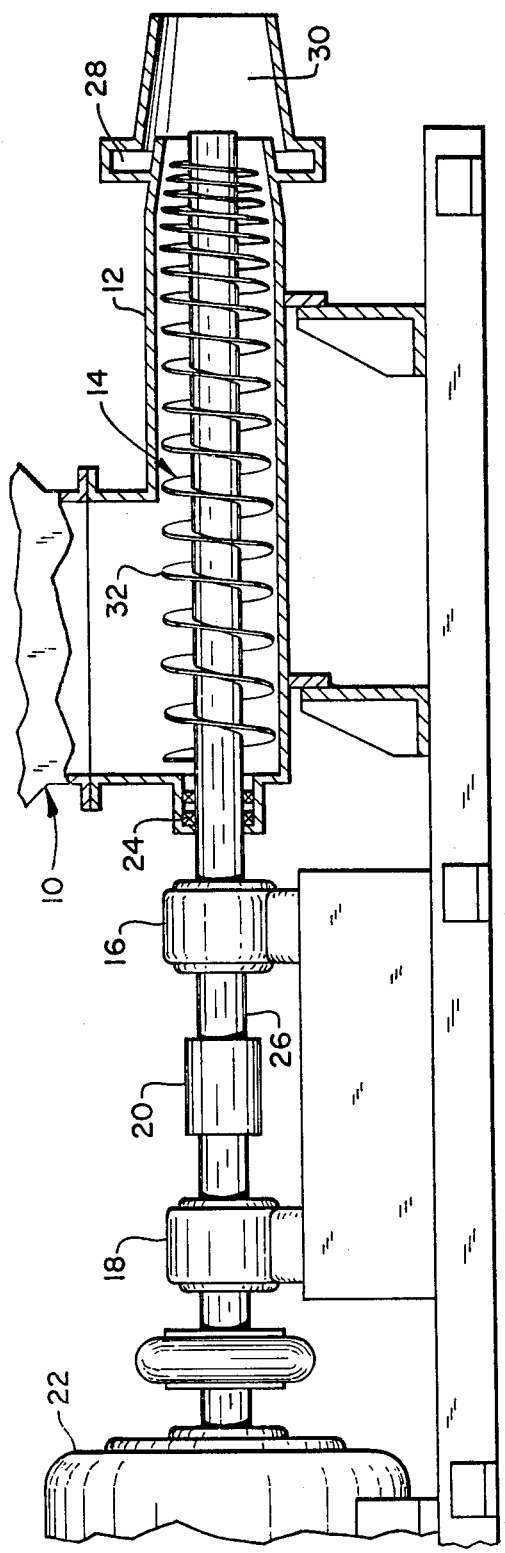
FIG. 1 is a general arrangement of the pump assembly.
Figure 2:
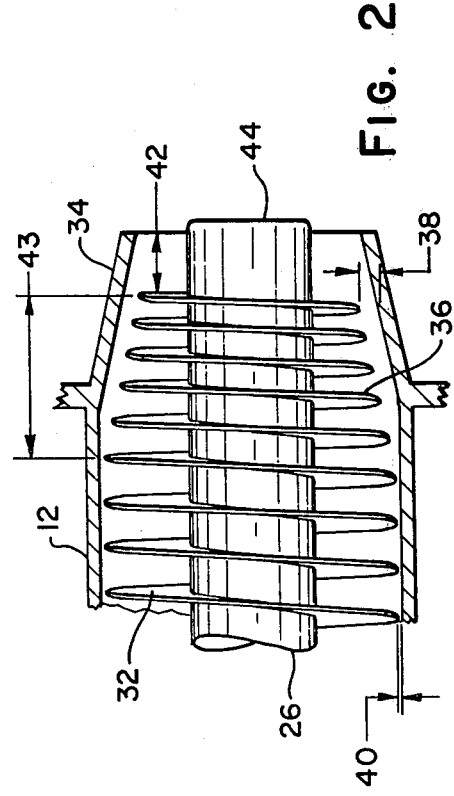
FIG. 2 is a detail at the discharge end of the pump.

An inlet hopper 10 is arranged to supply a granular material such as pulverized coal to the upstream side of a stationary cylinder 12. A rotary feed screw 14 is concentrically and rotatably mounted within the cylinder. The screw is cantilevered from radial bearing 16 and thrust bearing 18 with an adjustable length joint 20 located between the bearings. Drive motor 22 rotates the screw at a high speed such as 1250 rpm.

Seal 24, preferably of the air injection type, seals the shaft 26 as it passes through the upstream end of the cylindrical housing. At the downstream end of the housing an air header 28 supplies air into a nozzle mixing chamber 30 for the purpose of entraining the coal in a stream of air. The air pressure as used here, in chamber 30, is in the order of two to three atmospheres. In order to obtain effective sealing, the granular material must contain a reasonable amount of fines.

The screw 14 has helical flights 32 welded thereto with a decreasing pitch as the flights proceed towards the discharge end. With the high speed of rotation of the screw it is believed that the coal flowing within the screw forms an annular band so that the space between the flights is not full. As the pitch decreases the mass is compacted and the air forced back to a vent (not shown) located in the upstream end.

A frustoconical reducing nozzle 34 is bolted to the discharge end of cylinder 12. This nozzle forms an angle with respect to the cylinder of approximately 6 degrees. The tapered flights 36 at the downstream end of the screw have a tapered reducing outside diameter at an angle matching that of the nozzle. It is believed that an angle slightly greater than that of the nozzle would also perform satisfactorily. The feed screw is not fully installed into the nozzle but is withdrawn and located within the nozzle such that the clearance 38 between the tapered flights and the nozzles is significantly greater than the clearance 40 between the constant OD flights and the bore of the cylinder 12.

In the specific embodiment with a 4 inch bore through cylinder 12, the radial clearance 40 was 0.009 inches while the radial clearance 38 was tested at 0.125 and 0.250 inches. Satisfactory operation is expected with the clearance 38 being twice the clearance 40, and superior operation is expected where the clearance 38 is just over four times the clearance 40.

The tapered flights 36 should extend within the nozzle 34 but should not pass completely therethrough. An unperturbed zone 42 is required to permit the formation of an undisturbed coal plug which will effectively resist the backward flow of pressurized gas.

The longitudinal length 43 of the tapered flights 36 was varied during experiments. It was found that in the 4 inch bore the best results were obtained between 1½ and 2½ inches. Accordingly, the length of the tapered portion of the screw is preferably between 40 and 60 percent of the inside diameter of the cylinder 12.

It is also believed, because of the theory set forth later, that the radial clearance between the tapered flights and the nozzle should be greater than three times the largest particle size of the material being pumped.

A columnar plug 44 in the form of a cylinder is fastened to the end of shaft 26. It extends concentrically with the nozzle through at least a portion of the nozzle beyond the tapered flights. The annular space between the plug and the nozzle is completely free and undisturbed, thereby permitting a plug of a coal to be formed in this area to resist reverse gas leakage. The annular shape of this plug gives it more strength than a disc-shaped plug would have, and the forming of the plug is facilitated in light of the high speed of rotation of the shaft and the higher concentration of coal on the outer edges of the flights, particularly at low solids pump loadings.

Tests were carried out on a coal pump for pumping 3000 pounds per hour of coal into an atmosphere wherein the discharge pressure was up to two to three atmospheres. In all cases, the cylinder had a 4 inch ID; and the flights which were of constant outside diameter had a radial clearance with respect to the bore of 0.018 inches. In all tests the cylinder had a 6° reducing nozzle at the outlet end with a 3.5 inch inside diameter.

In the initial test the pump had flights with a constant outside diameter which stopped before the nozzle of the cylinder. The shaft of the screw continued and ran completely through the nozzle. It was found that the pump operated satisfactorily against discharge pressures up to 20 psig using over 16 horsepower when pumping 3000 pounds per hour. Effective sealing could not be obtained against pressure exceeding 20 psig. The power consumption varied linearly with the discharge pressure; and, accordingly, the pump used 0.8 horsepower per psi at 3000 pounds per hour coal flow.

The screw was modified to extend the flights so that they had at the end an outside diameter taper equal to that of the nozzle. A series of tests were run extending the length 1, 1.5, 2.0, and 2.5 inches, respectively. In this series of tests, the screw was left at its fully inserted position such that the clearance between the tapered flights and the nozzle was the same as that between the untapered flights and the cylinder. Using the same shaft speed of 1250 rpm and the same coal feed rate of 3000 pounds per hour, tests were run over discharge pressures from 0 to 35 psig. The power consumption in each of these tests was 0.7, 0.65, 0.3, and 0.3 horsepower per psi, respectively. It was, furthermore noted that the horsepower consumption with respect to a discharge pressure remained linear. However, at higher discharge pressures the linear relationship lasted for only one to five minutes, after which it rose rapidly toward the original horsepower consumption curve. For instance, using the 1½ inch extension, this point occurred beyond 20 psig discharge pressure.

At this time, on one test, the screw was retracted to increase the coal plug thickness, rather than follow the usual procedure of machining a shorter extension. It was noted that the power surge disappeared. To check the possibility that the previous surge was caused by heat expansion of the shaft, it was returned to its original position and cooled with dry ice. The power surge returned.

A series of tests were then run retracting the screw up to 9/16 of an inch, thereby providing a radial clearance between the tapered flights and the nozzle of up to 0.25 inches. Power consumption was reduced from the original 0.8 horsepower per psi to 0.29 horsepower per psi when pumping 3000 pounds per hour, which was an overall reduction of power of 63.5 percent. This was accomplished with a 2.0 inch extension of the tapered flights, and with withdrawals of 0.125 to 0.313 inches. This resulted in a radial clearance within the nozzle of approximately 0.022–0.040 inches. It was found that the power surges occurring at the high discharge pressures after a short period of operation were eliminated.

Increasing the retraction from 0 to 5/16 of an inch with a 2¼ inch flight extension increased the maximum obtainable steady-state discharge pressure, and very little change in power consumption occurred with this amount of retraction. Retracting the screw beyond this resulted in increased power consumption.

Tests were run with the tapered flights extending completely thru the nozzle. The pump would not operate in that it would not seal. It was also noted that the tapered flights seem to cooperate with the coal to form a bearing. The pump was quieter when the coal was actually forming a seal and became noisy when sealing was lost.

It is speculated that in the first modification with the tapered flights being immediately adjacent the nozzle that the shearing force occurring on the coal is a result of movement of the screw relative to the stationary discharge nozzle. Because of the close tolerance between the flight and the nozzle, only a thin layer of coal would exist; and the discharge nozzle would begin coking at higher discharge pressures. The coking of the coal would cause extensive frictional forces in this area. This phenomenon would occur at higher discharge pressure because higher forces are involved, and the discharge temperature normally increases with the higher discharge pressure and the normally expected linear increased power input.

By retracting the screw relative to the discharge nozzle, however, the shearing force created by the screw's movement is against a stationary or slowly moving finite boundary layer of coal. This continuous flow of coal and the reasonable boundary layer thickness avoids coking phenomenon and frictional drag experienced in the close clearance embodiment.

Furthermore, this arrangement would appear to give a wider range of throughput capability without experiencing high compressive and concomitant frictional forces. As the diameter of the flights within the nozzle is decreased, the volume within them is decreasing, resulting in a compaction of the coal. If because of the high rotational speed the flight is not full, it would result in an inward movement of the coal particles to fill the space between the flights. On the other hand, if the loading were relatively high such that flights were already full, the pressure would tend to increase. With the rotating flights tending to stir the powdered mixture, it could flow rather fluently out through the clearance, thereby avoiding high forces and friction due to over-compacting of the coal.

We claim:

1. An apparatus for feeding a granular material into a pressurized zone comprising: a stationary hollow cylinder having a bore; a frustoconical reducing nozzle located at a discharge end of said cylinder; means for feeding the granular material into said cylinder at an upstream located of said cylinder; a rotary feeder screw concentrically located within said cylinder and having helical flights thereon, said flights having a decreasing pitch towards the discharge end; means for rotating said feed screw at high speeds; said flights having an OD only slightly less than said bore through a majority of the length of said feed screw, and having a tapered decreasing OD at the discharge end, the taper being at least as great as that of said nozzle; said feed screw being located within said cylinder such that the radial clearance between the nozzle bore and the tapered flights is significantly greater than that between the bore of the cylinder and the flights through the majority of length, and the tapered flight extending through only a portion of said nozzle; and a columnar plug rotating with said screw and concentrically located with said nozzle.

2. An apparatus as in claim 1 wherein the length of the tapered portion of the flights is greater than 40 percent of the inside diameter of the bore.

3. An apparatus as in claim 2 wherein the length of the tapered portion of the flights is less than 60 percent of the inside diameter of the bore.

4. An apparatus as in any one of claims 1 through 3 wherein the radial clearance of the tapered flights within the nozzle is greater than two times the clearance of the non-tapered flights within the bore.

5. An apparatus as in claim 4 wherein the clearance between the tapered flights and the nozzle is greater than four times the clearance of the non-tapered flights within the bore.

6. An apparatus as in any one of claims 1 through 3 wherein said columnar plug is cylindrical.

7. An apparatus as in claim 5 wherein said columnar plug is cylindrical.

8. An apparatus as in any one of claims 1 through 3 wherein the radial clearance between the tapered flights and the nozzle is greater than three times the largest particle size of the material to be fed.

9. An apparatus as in any one of claims 1 through 3 wherein the angle of the taper of the flights equals the angle of taper of the nozzle.

10. An apparatus as in claim 5 wherein the angle of the taper of the flights equals the angle of taper of the nozzle.

11. An apparatus as in any one of claims 1 through 3 wherein the taper of the flights equals the taper of the nozzle, and wherein said columnar plug is a cylindrical extension of said feed screw.

12. An apparatus as in claim 5 wherein the angle of the taper of the flights equals the angle of taper of the nozzle.

* * * * *